US012441114B2

(12) United States Patent
Okuyama et al.

(10) Patent No.: US 12,441,114 B2
(45) Date of Patent: Oct. 14, 2025

(54) LIQUID REPLENISHING BOTTLE, LIQUID REPLENISHING SYSTEM, AND LIQUID STORAGE CONTAINER

(71) Applicant: CANON KABUSHIKI KAISHA, Tokyo (JP)

(72) Inventors: Norihisa Okuyama, Kanagawa (JP); Junichiro Iri, Kanagawa (JP); Yusuke Hashimoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 96 days.

(21) Appl. No.: 17/829,701

(22) Filed: Jun. 1, 2022

(65) Prior Publication Data

US 2022/0396089 A1 Dec. 15, 2022

(30) Foreign Application Priority Data

Jun. 14, 2021 (JP) ................................ 2021-098816

(51) Int. Cl.
*B41J 2/175* (2006.01)
*B43K 11/00* (2006.01)

(52) U.S. Cl.
CPC ......... *B41J 2/17506* (2013.01); *B43K 11/005* (2013.01)

(58) Field of Classification Search
CPC .................................................... B41J 2/17506
See application file for complete search history.

(56) References Cited

U.S. PATENT DOCUMENTS 4,969,759 A 11/1990 Suzuki et al. ........... B41J 2/175
5,199,470 A * 4/1993 Goldman ............. B41J 2/17506 141/2
5,790,157 A * 8/1998 Higuma ............... B41J 2/17506 347/85
6,942,327 B2 * 9/2005 Suzuki ................. B41J 2/17513 347/86
8,403,466 B1 * 3/2013 Turgeman ............ B41J 2/17506 347/85
2001/0009431 A1 7/2001 Kobayashi et al. ..... B41J 2/175
2003/0007046 A1 * 1/2003 Asano .................. B41J 2/17509 347/86
2011/0193917 A1 8/2011 Enderle et al. ........ B65D 35/24
(Continued)

FOREIGN PATENT DOCUMENTS

CN 201626821 U 11/2010
CN 204022447 U 12/2014
(Continued)

OTHER PUBLICATIONS

U.S. Appl. No. 17/710,328, filed Mar. 31, 2022.
(Continued)

*Primary Examiner* — Shelby L Fidler
(74) *Attorney, Agent, or Firm* — Venable LLP

(57) ABSTRACT

A liquid replenishing container configured to replenish recording liquid to a liquid storage container having a receiving portion of the recording liquid, includes a holding portion that holds recording liquid to be replenished to the liquid storage container; and an injecting portion that has an opening to discharge the recording liquid in the holding portion, and that is inserted into the receiving portion of the liquid storage container, wherein the opening opens so as to face an inner wall of the receiving portion.

22 Claims, 6 Drawing Sheets

(56) References Cited

U.S. PATENT DOCUMENTS

| | | | | |
|---|---|---|---|---|
| 2011/0254902 | A1* | 10/2011 | Kieser | B41J 2/17523 347/85 |
| 2012/0287209 | A1* | 11/2012 | Yan | B41J 2/17506 347/85 |
| 2015/0062258 | A1 | 3/2015 | Yoshida et al. | B41J 2/175 |
| 2016/0052286 | A1 | 2/2016 | Kimura et al. | B41J 2/175 |
| 2017/0326882 | A1 | 11/2017 | Okude et al. | B41J 2/175 |
| 2017/0355195 | A1 | 12/2017 | Fukasawa et al. | B41J 2/17506 |
| 2018/0244054 | A1 | 8/2018 | Kanaya et al. | B41J 2/175 |
| 2018/0345673 | A1 | 12/2018 | Shirono et al. | B41J 2/175 |
| 2020/0369441 | A1* | 11/2020 | Luke | B05B 15/65 |
| 2021/0237456 | A1 | 8/2021 | Mizutani et al. | B41J 2/17509 |
| 2021/0370682 | A1 | 12/2021 | Murakami et al. | B41J 2/175 |

FOREIGN PATENT DOCUMENTS

| | | |
|---|---|---|
| CN | 104417074 | 3/2015 |
| CN | 207140560 U | 3/2018 |
| JP | H02-63746 | 3/1990 |
| JP | H08-132636 | 5/1996 |
| JP | 2003-019812 | 1/2003 |
| JP | 2015-131434 | 7/2015 |
| JP | 2015-227203 | 12/2015 |
| JP | 2016-190335 | 11/2016 |
| JP | 2017-205895 | 11/2017 |
| JP | 2018-070162 | 5/2018 |
| JP | 2018-161743 | 10/2018 |
| JP | 2018-202679 | 12/2018 |
| TW | 201121631 | 7/2011 |

OTHER PUBLICATIONS

Office Action dated Mar. 4, 2025 in counterpart Japanese Application No. 2021-098816, together with English translation thereof.

Office Action dated Jan. 25, 2025 in counterpart Chinese Application No. 202210655119.7, together with English translation thereof.

Office Action dated Jul. 29, 2025 in counterpart Chinese Application No. 202210655119.7, together with English translation thereof.

* cited by examiner

LIQUID REPLENISHING BOTTLE, LIQUID REPLENISHING SYSTEM, AND LIQUID STORAGE CONTAINER

BACKGROUND OF THE INVENTION

Field of the Invention

The present invention relates to a liquid replenishing container, a liquid replenishing system, and a liquid storage container.

Description of the Related Art

When recording liquid (ink) is replenished to a liquid storage container using a liquid replenishing container, the replenished recording liquid may splash on the liquid surface in the liquid storage container, and contaminate the surroundings.

An ink replenishing auxiliary device according to Japanese Patent Application Publication No. 2018-161743 includes a connecting portion that is connectable with an ink inlet member having a passage in the axis direction in the liquid tight state, and an ink inflow portion to allow ink to flow into the connecting portion. The ink replenishing auxiliary device replenishes ink via these components whereby contamination, due to splashing from the ink liquid surface, is controlled.

In the case of the configuration including a component to replenish ink, when a component is connected to the ink replenishing auxiliary device or when a component is disconnected from the ink replenishing auxiliary device, ink adhered to the component may splash and contaminate the surroundings. An increase in a number of components also leads to an increase in cost.

SUMMARY OF THE INVENTION

The present invention provides a liquid replenishing container controlling the contamination caused by the recording liquid when the recording liquid is replenished to the liquid storage container.

A liquid replenishing container according to the present invention is configured to replenish recording liquid to a liquid storage container having a receiving portion of the recording liquid, and includes a holding portion that holds recording liquid to be replenished to the liquid storage container; and an injecting portion that has an opening to discharge the recording liquid in the holding portion, and that is inserted into the receiving portion of the liquid storage container, wherein the opening opens so as to face an inner wall of the receiving portion.

Further features of the present invention will become apparent from the following description of exemplary embodiments with reference to the attached drawings.

DESCRIPTION OF THE EMBODIMENTS

Preferred embodiments of the present invention will be described with reference to the drawings. Dimensions, materials, shapes and relative positions of the components described in the embodiments, however, should be appropriately changed depending on the configuration and various conditions when the present invention is applied, and are not intended to limit the scope of the invention to the following embodiments.

Embodiment 1

The liquid replenishing system is a system to replenish liquid (recording liquid) from a liquid replenishing container to a liquid storage container. The liquid replenishing container is a container to replenish the recording liquid to the liquid storage container. A plurality of liquid storage containers are installed in a liquid discharging device, which discharges the liquid (recording liquid) for recording, using a recording head. The liquid replenishing container and the liquid storage container according to Embodiment 1 control the contamination caused by the recording liquid when the recording liquid is replenished. The contamination caused by the recording liquid in a comparative example will be described first with reference to FIGS. 6 and 7.

Figure 6:
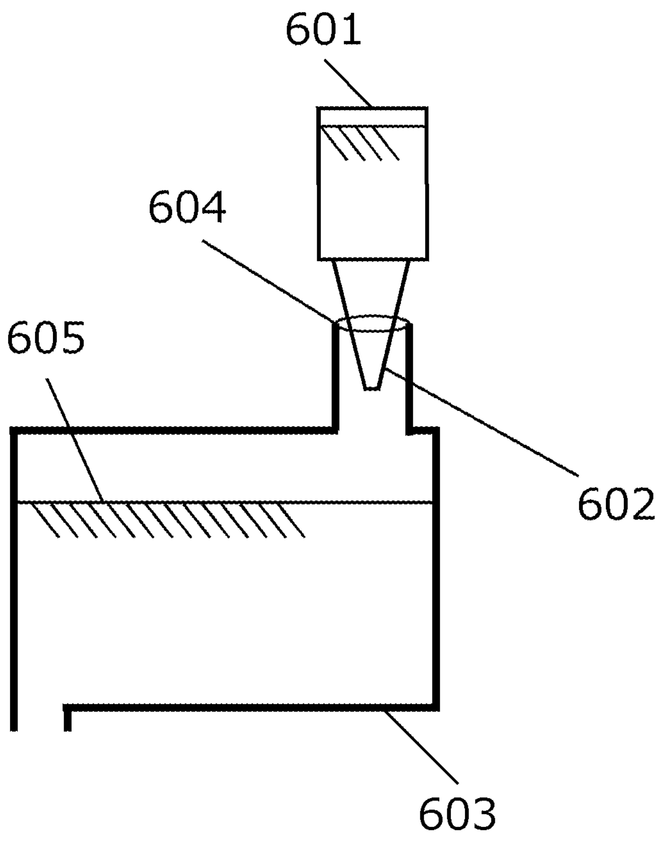
PRIOR ART FIG. 6
FIG. 6 is a diagram depicting an example of replenishing recording liquid from the liquid replenishing container to the liquid storage container.

FIG. 6 is a diagram depicting an example of replenishing the recording liquid from a liquid replenishing container 601 to a liquid storage container 603 according to a comparative example. The liquid replenishing container 601 includes an injecting portion 602 to replenish recording liquid to the liquid storage container 603. The liquid storage container 603 includes a receiving port 604 to which the injecting portion 602 is inserted, so as to inject the recording liquid from the liquid replenishing container 601.

Figure 7:
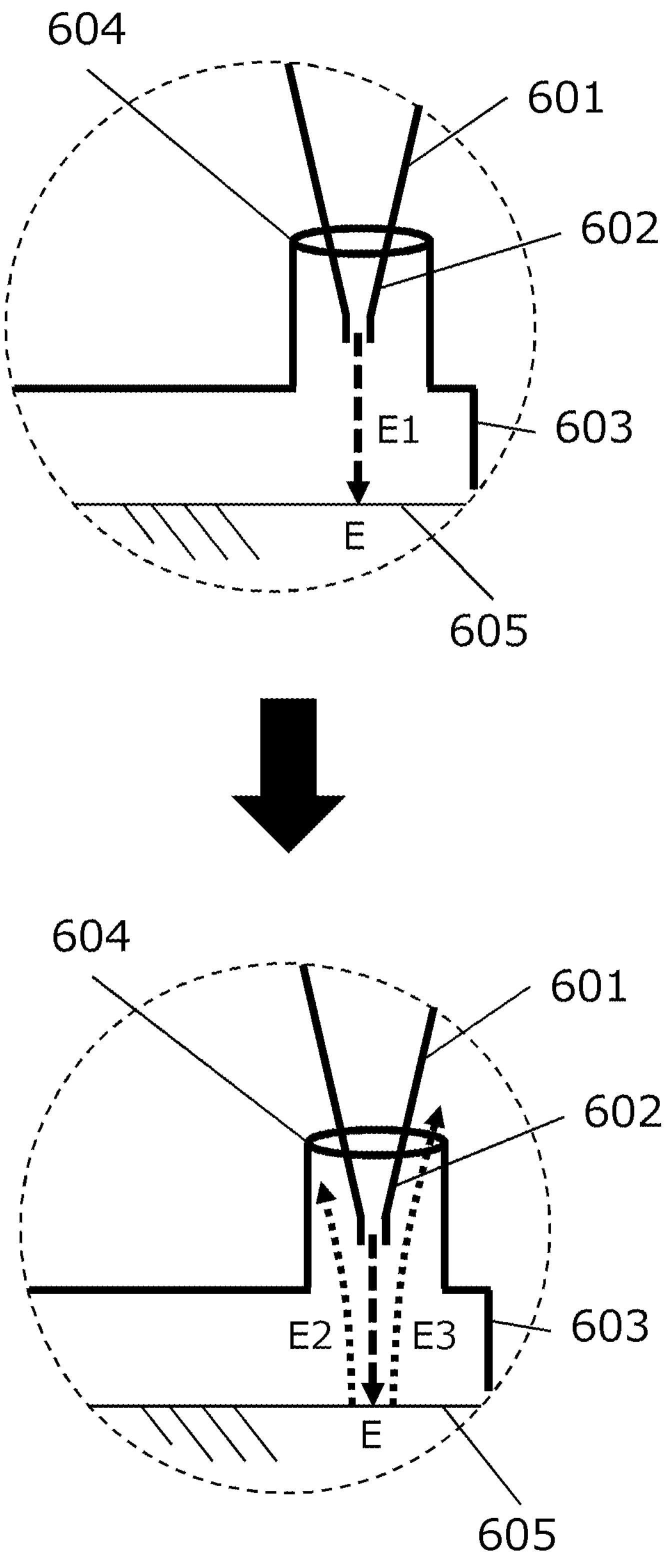
PRIOR ART FIG. 7
FIG. 7 is a diagram depicting splashing of the recording liquid when the liquid is replenished.

FIG. 7 is a diagram depicting splashing of the recording liquid that occurs when the liquid is replenished. FIG. 7 indicates enlarged views of the vicinity of the receiving port 604 of the liquid storage container 603 and the injecting portion 602 of the liquid replenishing container 601 according to the comparative example.

In FIG. 7, the recording liquid to be replenished is directly dripped from the injecting portion 602 of the liquid replenishing container 601 onto a liquid surface 605 of the recording liquid stored in the liquid storage container 603. The dripped recording liquid contacts with the liquid surface 605 at point E (E1). When the recording liquid contacts with the liquid surface 605, the recording liquid splashes from the liquid surface 605 (E2, E3), and in some cases the recording liquid may splash out of the receiving port 604 of the liquid storage container 603 and contaminate the surroundings (E3).

Control of the splashing in a liquid replenishing system 100 when the recording liquid is replenished will be described with reference to FIG. 1. The liquid replenishing system 100 includes a liquid storage container 101 and a liquid replenishing container 201.

The liquid storage container 101 according to Embodiment 1 includes a receiving portion 102 to which recording liquid is injected, and a storage portion 105 in which the recording liquid, injected via the receiving portion 102, is stored. The receiving portion 102 includes a receiving port 103 to which an injecting portion 202 of the liquid replenishing container 201 is inserted. The recording liquid is injected to the receiving portion 102 via an opening of the injecting portion 202. On an inner wall 104 of the receiving portion 102, there is a region which faces the opening of the injecting portion 202. The recording liquid is replenished to the storage portion 105 via the region facing the opening of the injecting portion 202.

The liquid replenishing container 201 includes the injecting portion 202 to discharge the recording liquid in the horizontal direction, and a holding portion 203 which holds the recording liquid to be replenished to the liquid storage container 101. The injecting portion 202 has an opening to discharge the recording liquid held in the holding portion 203. The opening opens so as to face the inner wall 104 of the receiving portion 102. The injecting portion 202 is inserted into the receiving portion 102 via the receiving port 103 of the liquid storage container 101. FIG. 1 includes enlarged views of areas around the receiving portion 102 of the liquid storage container 101 and the injecting portion 202 of the liquid replenishing container 201, so as to schematically indicate the flow when the recording liquid is discharged and dripped onto a liquid surface 106.

When the recording liquid is injected in a state where the opening of the injecting portion 202 faces the inner wall 104 of the liquid storage container 101, the recording liquid discharged from the injecting portion 202 contacts with the inner wall 104 of the receiving portion 102 at point A. The recording liquid that contacts at point A drips while decelerating onto point B (a corner formed in the inner wall 104) (B1).

The decelerated recording liquid drips from point B and contacts with the liquid surface 106 at point C (C1). The recording liquid is dripped from point B, which is lower than the injecting portion 202, to the liquid surface 106, at a slower speed compared with the case of directly dripping from the injecting portion 202. Therefore the splashing of the recording liquid, discharged from the opening of the injecting portion 202 toward the inner wall 104 of the receiving portion 102, is controlled. Further, the state that the recording liquid, discharged toward the inner wall 104 of the receiving portion 102, splashes out of the receiving port 103, is controlled.

In a case where the recording liquid to be replenished easily foams, the foaming of the recording liquid is controlled by the reduction of the speed of the dripping of the recording liquid along the inner wall 104, since air trapped in the liquid surface 106 decreases. By controlling the foaming, contamination of the surroundings caused by an overflow of the foamed recording liquid from the receiving port 103 is suppressed. Further, the wait for defoaming of the foamed recording liquid during replenishing the recording liquid can be decreased.

Figure 2:
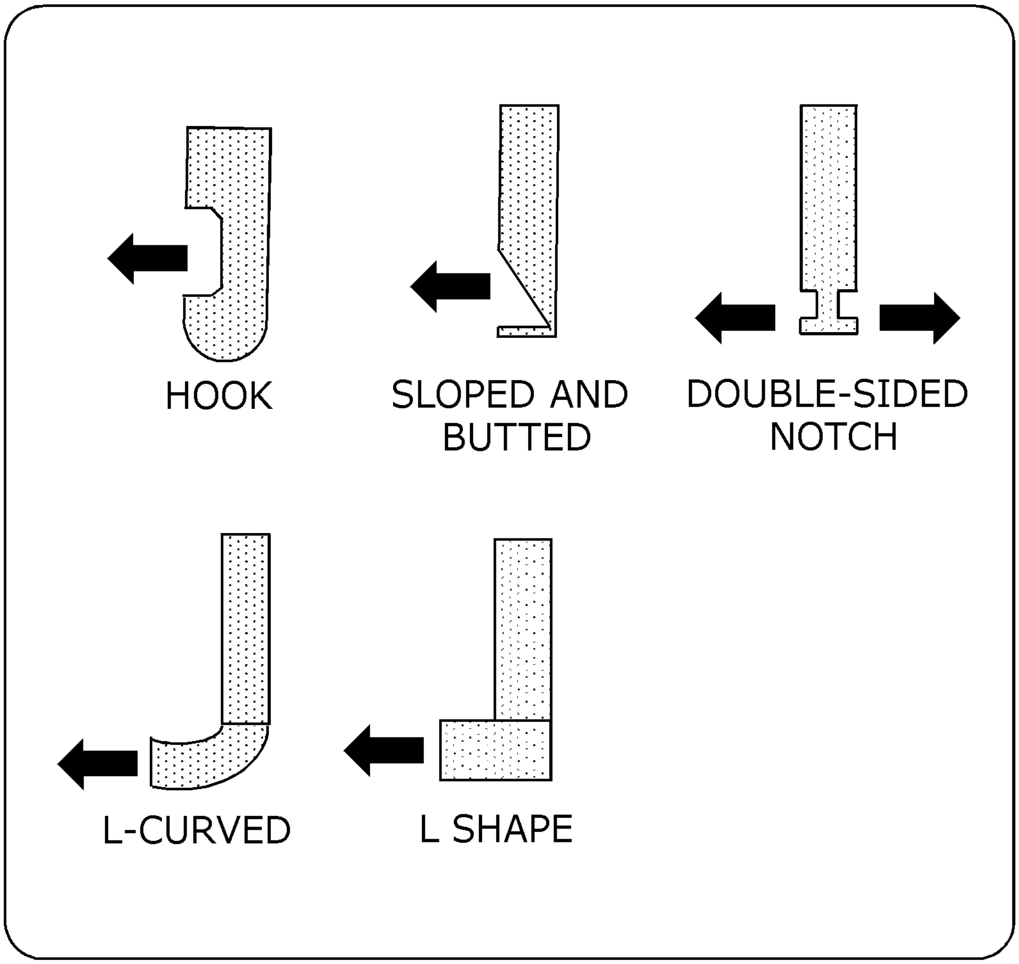
FIG. 2 is a diagram depicting examples of a tip shape of a liquid replenishing container.

FIG. 2 is a diagram depicting examples of the tip shape of the injecting portion 202 of the liquid replenishing container 201. For example, the tip of the injecting portion 202 has a hook shape, a sloped-and-butted shape, a double-sided notch shape, an L-curved shape, or an L shape. The tip shape of the injecting portion 202 may be any shape, as long as the recording liquid can be discharged so as to contact with the inner wall 104 of the receiving portion 102 of the liquid storage container 101, and is not limited to the shapes exemplified in FIG. 2.

The hook shape, the sloped-and-butted shape, and the double-sided notch shape are examples where a side face of the tip facing the inner wall 104 of the receiving portion 102 of the liquid storage container 101 is open, when the injecting portion 202 is inserted into the receiving portion 102. In the injecting portion 202, the tip side is configured to have a bottomed cylindrical shape, a passage of the recording liquid extending in the inserting direction is included, and an opening is formed at a part of a cylindrical portion of the injecting portion 202.

The hook shape is a shape where an approximately hemispherical bottom portion is disposed on the tip side of the injecting portion 202, and a notch (opening) is formed on the side face on the tip side. The sloped-and-butted shape is a shape where a notch (opening) of the injecting portion 202 is formed such that the width in the circumferential direction increases in the direction toward the tip of the injecting portion 202. In the case of the sloped-and-butted shape of which the bottom portion is flat, the direction of discharging the recording liquid is more easily determined than the case of the hook shape.

The double-sided notch shape is a shape where a notch (opening) is formed on each side of the injecting portion 202 as a pair, in a direction orthogonal to the inserting direction. The openings are not limited to being disposed on each side face facing each other, but may be disposed at three or more locations, or a plurality of openings may be formed on one side.

In the case of forming a notch (opening) at the tip of the injecting portion 202, such as the cases of the hook shape, the sloped-and-butted shape and the double-sided notch shape, there is no protruded portion at the tip, hence capping of the injecting portion 202 is easy. Further, in the case of forming an opening at the tip of the injecting portion 202, the receiving portion 102 can be smoothly installed since the tip does not interfere with the receiving port 103 very much.

The L-curved shape is a shape where the tip of the injecting portion 202 is curved in an L shape. The injecting portion 202 has a curved tip which is curved and protruded from the end of the inserting direction of the injecting portion 202, toward the inner wall 104 of the receiving portion 102. The opening of the injecting portion 202 is opened in the direction where the curved tip protrudes. The tip of the injecting portion 202 is not limited to the L shape illustrated in FIG. 2, but may be curved in a gentle arc shape, as long as the opening to discharge the recording liquid faces the inner wall 104 of the receiving portion 102.

The L shape is a shape where the tip of the injecting portion 202 is L-shaped. The injecting portion 202 has a tip which protrudes in a direction toward the inner wall 104 of the receiving portion 102, that is, in a direction intersecting with the inserting direction of the injecting portion 202. The opening of the injecting portion 202 is opened at the tip in the direction where the tip protrudes. The shape of the tip is not limited to the L shape, but may be a shape curved at a predetermined angle in accordance with the shape of the receiving portion 102 of the liquid storage container 101.

In the case where the tip shape of the injecting portion 202 is the hook shape, the sloped-and-butted shape or the double-sided notch shape, the opening area can be wider than the case of the L-curved shape or the L shape. In the case of the hook shape, the sloped-and-butted shape or the double-sided notch shape is used for the injecting portion 202, the recording liquid is charged at a slower speed than the case where the L-curved shape or the L shape is used for the injecting portion 202, if the pressure to replenish the recording liquid is the same. By reducing the speed of the recording liquid, a further splashing control effect can be expected.

In the case of discharging the recording liquid at a reduced speed, it is preferable to locate the opening of the injecting portion 202 of the liquid replenishing container 201 close to the inner wall 104 of the liquid storage container 101, so that the recording liquid can contact with the inner wall 104.

Especially in the case where the tip shape of the injecting portion 202 is the double-sided notch shape, the recording liquid is replenished at a slower speed than the case of the hook shape or the sloped-and-butted shape. In this case, it is preferable that the injecting portion 202 is disposed such that the opening is located even closer to the inner wall 104 of the liquid storage container 101.

On the other hand, in the case where the tip shape of the injecting portion 202 is the L-curved shape or the L shape, the opening area is narrower than the case of the hook shape or the sloped and butted shape, and the flow of the recording liquid is faster and linear. Therefore compared with the case where the tip shape is the hook shape or the sloped-and-butted shape, the opening of the injecting portion 202 can be more distant from the inner wall 104.

Embodiment 2

In Embodiment 2, the shape of the receiving portion 102 is changed, whereby the speed of the recording liquid is reduced, and the splashing of the recording liquid is further controlled compared with Embodiment 1. FIGS. 3A to 3F are diagrams depicting control of the splashing of the recording liquid according to Embodiment 2, when the recording liquid is replenished.

Figure 1:
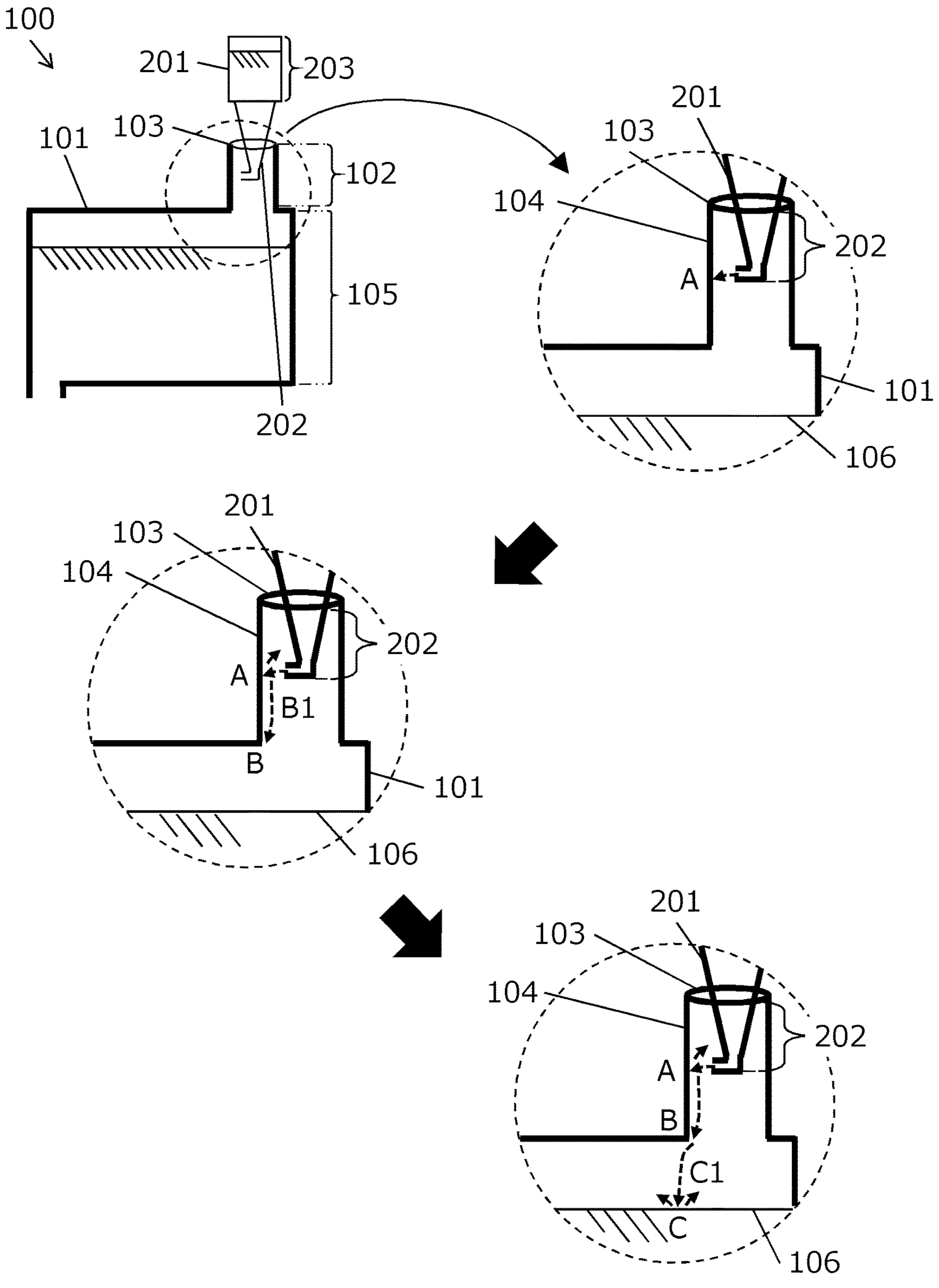
FIG. 1 is a diagram depicting a control of splashing when recording liquid is replenished in a liquid replenishing system.

The configurations of a liquid storage container 101 and a liquid replenishing container 201 according to Embodiment 2 are the same as Embodiment 1, but the shape of a receiving portion 102 of the liquid storage container 101 is different from the example illustrated in FIG. 1. The shape of the receiving portion 102 according to Embodiment 2 includes: a shape where the inner wall with which the recording liquid replenished via the injecting portion 202 contacts is inclined; and a shape where a depressed portion or a step difference is formed on the inner wall 104. By the shape of the receiving portion 102 of Embodiment 2 as well, the liquid storage container 101 and the liquid replenishing container 201 can control the contamination caused by the recording liquid when the recording liquid is replenished.

Figure 3A:
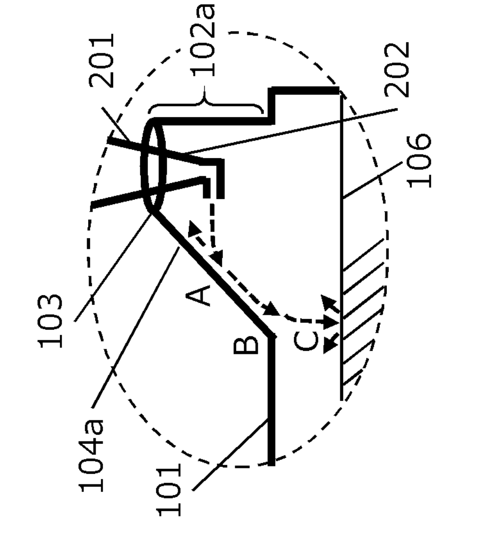
FIGS. 3A to 3F are diagrams depicting control of splashing when the recording liquid is replenished in Embodiment 2.

FIG. 3A indicates an example where the inner wall 104*a* of the receiving portion 102*a* includes an inclined surface in a region facing an opening of the injecting portion 202. The inclined surface is inclined such that the recording liquid, which is discharged toward the inner wall 104*a* of the receiving portion 102*a*, contacts with the inner wall 104*a* and then moves in the direction toward the storage portion 105. The inclined surface is inclined so as to be distant from the receiving port 103 in the direction orthogonal to the inserting direction of the injecting portion 202, as the distance from the receiving port 103 increases. In FIG. 3A, the injecting portion 202 is inserted downward into the receiving portion 102 in the vertical direction.

When the recording liquid to be replenished is discharged from the opening of the injecting portion 202, the recording liquid contacts with the inner wall 104*a* at point A, which is a position facing the opening, and propagates to point B along the inclined surface of the inner wall 104*a*. Since the inner wall 104*a* is inclined, the recording liquid drips to point C on the liquid surface 106 from point B, which is distant from the receiving port 103. Therefore the state that the recording liquid contact point C on the liquid surface 106 splashes out from the receiving port 103 can be controlled.

Figure 3B:
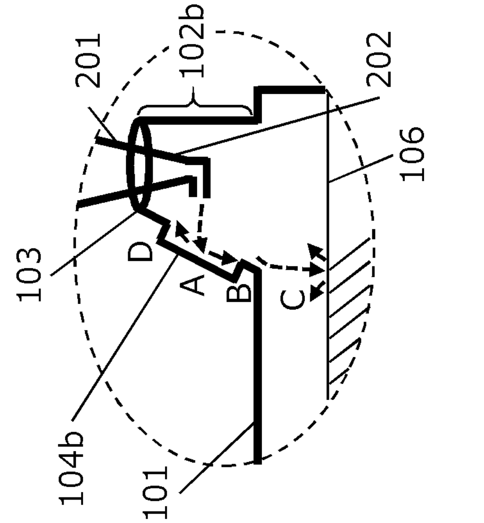

FIG. 3B indicates an example where the inner wall 104*b* of the receiving portion 102*b* includes an inclined surface, just like FIG. 3A, and a depressed portion is formed on the inclined surface. In FIG. 3B, the injecting portion 202 is inserted downward into the receiving portion 102*b* in the vertical direction.

The receiving portion 102*b* includes a first wall face, which faces the injecting portion 202, on the side of the inner wall 104*b* closer to the receiving port 103. The receiving portion 102*b* also includes a second wall face (bottom face of the depressed portion), which is more distant from the injecting portion 202 than the first wall face, and faces the opening, on the side of the inner wall 104*b* more distant from the receiving port 103 than the first wall face. The receiving portion 102*b* has a protrusion on the outer face at a position corresponding to the second wall face.

The receiving portion 102*b* has an inclined surface, just like the receiving portion 102*a* illustrated in FIG. 3A, whereby the state that the recording liquid splashes out of the receiving port 103 can be controlled.

The depressed portion is formed on the inner wall 104*b*, hence even if the recording liquid contacts with the inner wall 104*b* at point A and splashes toward the receiving port 103 side, the state that the recording liquid splashes out of the receiving port 103 can be controlled because of the step difference D on the receiving port 103 side.

On the inner wall 104*b*, the receiving portion 102*b* includes a protruded portion (step difference B) protruding out to a region facing the opening, on the side more distant from the receiving portion 102*b* than the region facing the opening. By the step difference B, the speed of the recording liquid dripping onto the liquid surface 106 is further reduced, hence the splashing of the recording liquid dripping on the liquid surface 106 at point C can be controlled.

In the example in FIG. 3B, the inner wall 104*b* has a depressed portion formed by the step difference B on the liquid surface 106 side and the step difference D on the receiving port 103 side, but the difference may be formed on only one of the liquid surface 106 side and the receiving port 103.

Figure 3C:
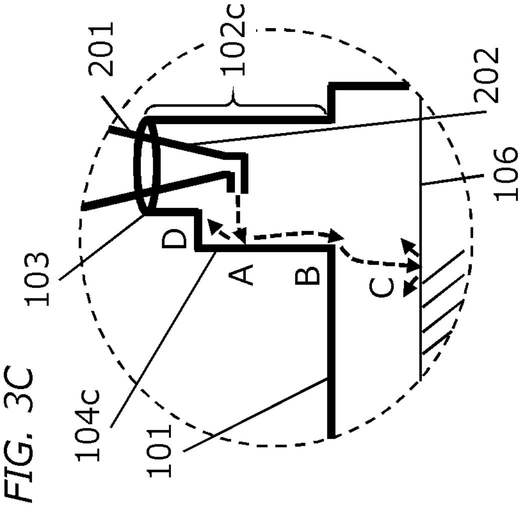

FIG. 3C indicates an example where the inner wall 104*c* of the receiving portion 102*c* has a step difference D on the side closer to the receiving port 103 than point A where the recording liquid, discharged from the injecting portion 202, contacts. In FIG. 3C, the injecting portion 202 is inserted downward into the receiving portion 102*c* in the vertical direction.

The receiving portion 102*c* includes a first wall face, which faces the injecting portion 202, on the side of the inner wall 104*c* closer to the receiving port 103. The receiving portion 102*c* also includes a second wall face (region including point A), which is more distant from the injecting portion 202 than the first wall face, and faces the opening, on the side of the inner wall 104*c* more distant from the receiving port 103 than the first wall face.

The receiving portion 102*c* has the step difference D on the receiving port 103 side, hence the recording liquid contacting with the inner wall 104*c* drips onto point C on the liquid surface 106 from point B which is distant from the receiving port 103. Thereby the state that the recording liquid contacting with the liquid surface 106 at point C splashes out of the receiving port 103 can be controlled. Further, even if the recording liquid contacting with the inner wall 104*c* at point A splashes toward the receiving port 103, the state that the recording liquid splashes out of the receiving port 103 can be controlled because of the step difference D.

Figure 3D:
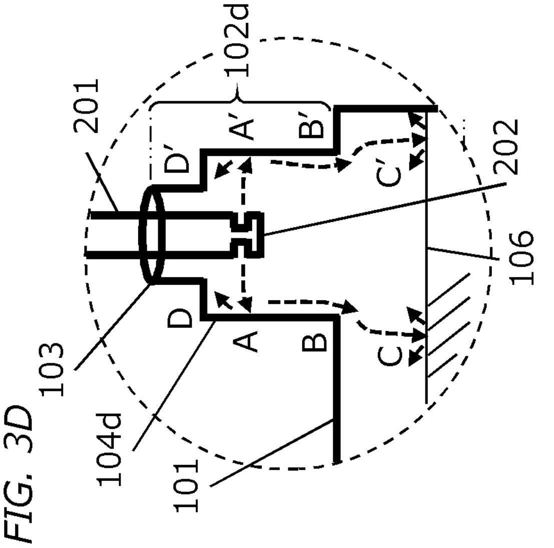

FIG. 3D indicates an example where an inner wall 104*d* of a receiving portion 102*d* has a step difference D and a step difference D' on the side closer to the receiving port 103 than point A, where the recording liquid, discharged from the injecting portion 202, contacts. In FIG. 3D, the injecting portion 202 is inserted downward into the receiving portion 102*d* in the vertical direction.

On the inner wall 104*d* on which the step difference D and the step difference D' are formed, a region facing the injecting portion 202 on the side closer to the receiving port 103 corresponds to "the first wall face". A surface facing the opening, which is more distant from the injecting portion 202 than the first wall face, on the side of the inner wall 104*d* more distant from the receiving port 103 than the first wall face, corresponds to "the second wall face".

In the case where the tip of the injecting portion 202 is the double-sided notch shape, the step difference D and the step difference D' may be formed in accordance with the direction of the opening of the injecting portion 202. By using the injecting portion 202 having the double-sided notch shape, the area of the opening from which the recording liquid is discharged becomes wide. Hence, the speed of the recording liquid is reduced even more, and splashing of the recording liquid is controlled.

In a case where the tip of the injecting portion 202 has an opening in one direction, as in the case of the hook shape, the injecting portion 202 may be inserted into the receiving port 103 such that the opening is directed to either the step difference D or the step difference D'. By aligning the opening of the injecting portion 202 with either the step difference D or the step difference D', splashing of the recording liquid is controlled.

Figure 3E:
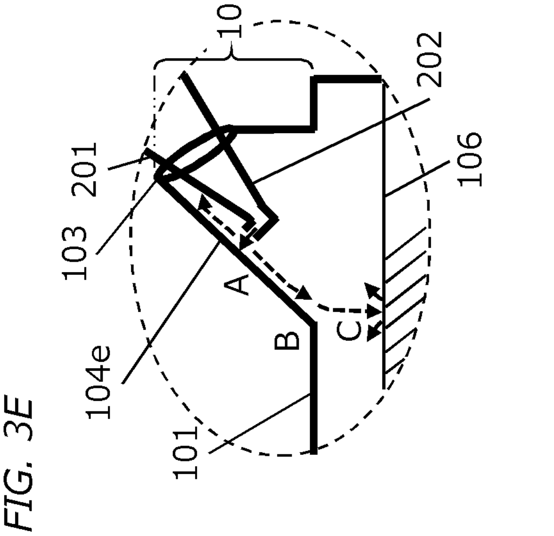

FIG. 3E indicates an example where the receiving portion 102*e* includes an inclined surface on the inner wall 104*e* in a region facing the opening of the injecting portion 202, and the injecting portion 202 is inserted downward into the receiving portion 102*e* diagonally with respect to the vertical direction. Since the receiving portion 102*e* has the inclined surface, the state that the recording liquid splashes out of the receiving port 103 can be controlled, just like the receiving portion 102*a* indicated in FIG. 3A.

The injecting portion 202 is inserted downward diagonally with respect to the vertical direction, hence when the recording liquid is replenished, the liquid replenishing container 201 can be inserted into the receiving port 103 without in a vertical state, so that the opening does not face the horizontal direction. In the example in FIG. 3E, dripping of the liquid from the injecting portion 202 can be controlled more than the case of inserting the injecting portion 202 into the receiving port 103 in the state where the liquid replenishing container 201 is vertical.

Figure 3F:
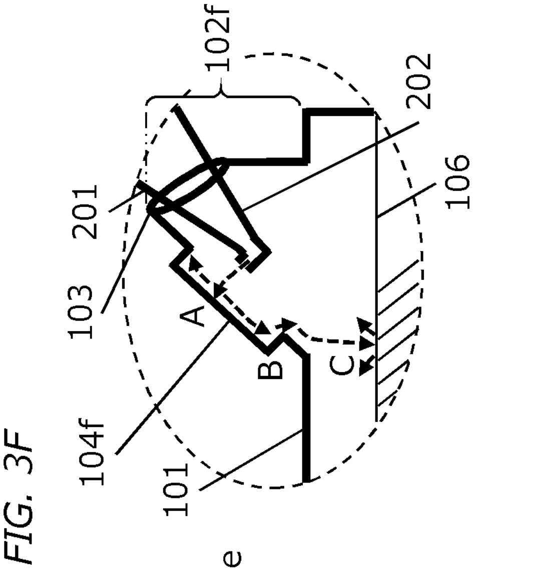

FIG. 3F indicates an example where the receiving portion 102*f* includes an inclined surface on the inner wall 104*f* in a region facing the opening of the injecting portion 202, and a depressed portion is formed on the inner wall 104*f*. Further, the injecting portion 202 is inserted downward into a receiving portion 102*f* diagonally with respect to the vertical direction.

On the inner wall 104*f* on which the depressed portion is formed, a region facing the injecting portion 202 on the side closer to the receiving port 103 corresponds to "the first wall face". A region facing the opening, which is more distant from the injecting portion 202 than the first wall face, on the side of the inner wall 104*f* more distant from the receiving port 103 than the first wall face, corresponds to "the second wall face".

Just like FIG. 3E, the receiving portion 102*f* includes an inclined surface on the inner wall 104*f* of the receiving portion 102*f*, and the injecting portion 202 is inserted downward into the receiving portion 102*f* diagonally with respect to the vertical direction, hence an effect the same as the receiving portion 102*e* can be implemented.

Furthermore, the receiving portion 102*f* includes the inclined surface on the inner wall 104*f* of the receiving portion 102*f*, and the depressed portion is formed on the inner wall 104*f*, hence the receiving portion 102*f* can implement a same effect as the receiving portion 102*b* of FIG. 3B.

Embodiment 3

Figure 4A:
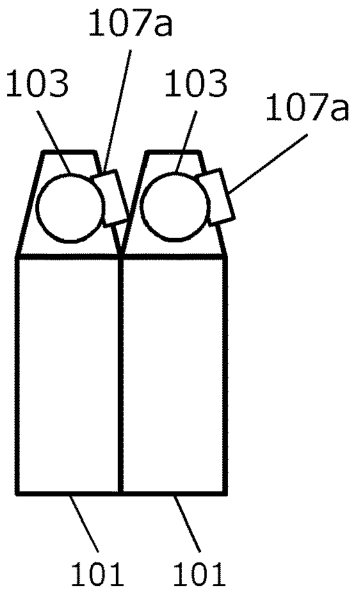
FIGS. 4A and 4B are diagrams depicting the positions of a depressed portion and a step difference which are formed on a receiving portion.
Figure 4B:
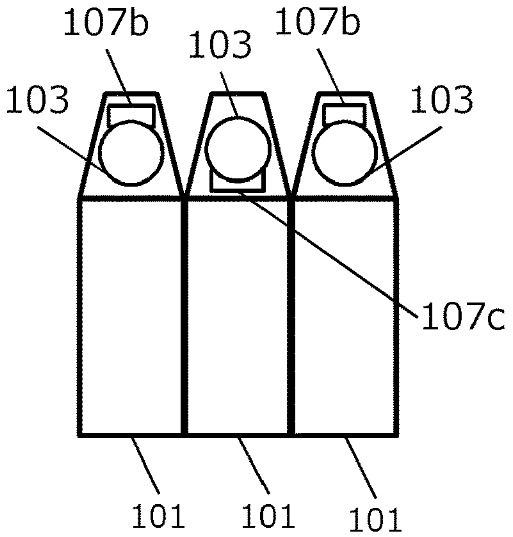

In Embodiment 3, the position, at which the depressed portion or the step difference is formed in the receiving portion 102 of the liquid storage container 101 in Embodiment 2, is limited. FIG. 4A and FIG. 4B are diagrams depicting the position of the depressed portion or the step difference which is formed in the liquid storage container 101 according to Embodiment 3.

When the depressed portion exemplified in FIG. 3B or FIG. 3F and the step difference exemplified in FIG. 3C or FIG. 3D is formed at the position 107*a* of the liquid storage container 101 on the side face as illustrated in FIG. 4A, the depressed portion or the step difference may contact an adjacent liquid storage container 101. Further, the installation width of the liquid storage container 101 increases.

In the liquid storage container 101 according to Embodiment 3, the depressed portion or the step difference in the receiving portion 102 are formed at a position 107*b* (top surface side of the liquid storage container 101) or a position 107*c* (front side), on the side where another liquid storage container is not disposed, as illustrated in FIG. 4B. By forming the depressed portion or the step difference on the inner wall 104 of the receiving portion 102, in the longitudinal direction of the liquid storage container 101, where another liquid storage container is not disposed, the depressed portion or the step difference can be confined to within the width of the liquid storage container 101.

Out of the depressed portion and the step difference formed on the inner wall 104 of the receiving portion 102, a region facing the opening of the injecting portion 202 corresponds to "the second wall face". On the inner wall 104 on which the depressed portion is formed, the step difference protruding to the region facing the opening, on the side more distant from the receiving port 103 than the region facing the opening, corresponds to "the protruded portion".

The liquid storage container 101 has a protrusion on the outer surface of the receiving portion 102, at a position corresponding to the second wall face. In a case where the liquid replenishing system 100 includes a plurality of liquid storing containers, the plurality of liquid storage containers are disposed adjacent to each other, such that each receiving portion 102 faces the same direction.

FIG. 4A indicates an example where each protrusion is formed on one side (position 107*a*) in a direction in which a plurality of liquid storage containers are adjacent to each other, on the outer surface of the receiving portion 102. FIG. 4B indicates an example where each protrusion is formed at a position distant from the region facing the adjacent receiving portion 102, on the outer surface of the receiving portion

102. By disposing each protrusion at a position distant from the region facing an adjacent receiving portion 102, on the outer surface of the receiving portion 102 as shown in FIG. 4B, contact of the protrusion with the adjacent liquid storage container 101 can be prevented.

Embodiment 4

Figure 5A:
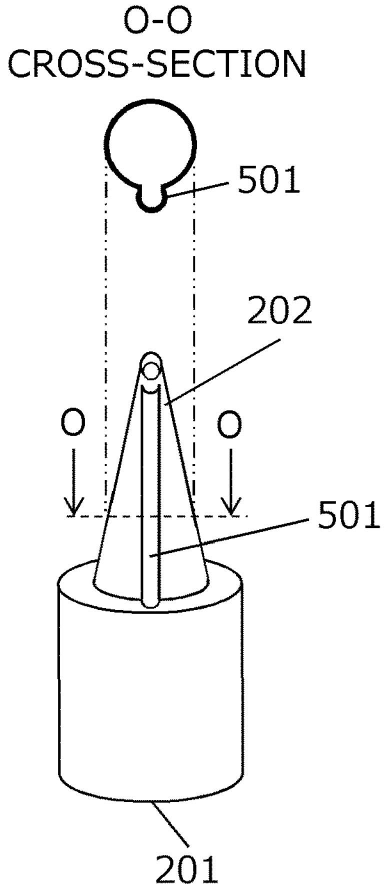
FIGS. 5A and 5B are diagrams depicting the positioning of the liquid storage container and the liquid replenishing container.
Figure 5B:
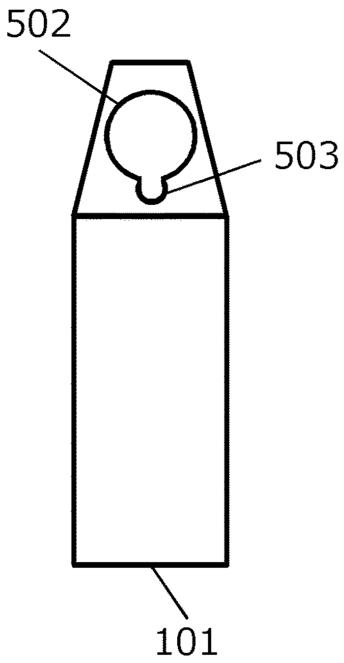

In Embodiment 4, the liquid storage container 101 and the liquid replenishing container 201 have an engaged portion and an engaging portion respectively to adjust positions with each other when the receiving portion 102 is inserted into the injecting portion 202. FIG. 5A and FIG. 5B are diagrams depicting the positioning between the liquid storage container 101 and the liquid replenishing container 201.

FIG. 5A is a diagram exemplifying the liquid replenishing container 201 according to Embodiment 4. The liquid replenishing container 201 includes an engaging portion 501 to position the injecting portion 202 with respect to a receiving portion 502 such that the opening of the injecting portion 202 faces a predetermined direction with respect to the inner wall of the receiving portion 502. In the case where the inclined surface, the depressed portion or the step difference is formed on the inner wall of the receiving portion 502, the predetermined direction may be the direction where the inclined surface, the depressed portion or the step difference is disposed.

FIG. 5B is a diagram exemplifying the liquid storage container 101 according to Embodiment 4. The liquid storage container 101 includes an engaged portion 503 that can be engaged with the engaging portion 501 of the liquid replenishing container 201. The engaged portion 503 positions the injecting portion 202 of the liquid replenishing container 201 with respect to the receiving portion 502, so that the opening of the injecting portion 202 is at the position facing a predetermined direction with respect to the inner wall of the receiving portion 502.

In the case of replenishing the recording liquid to the liquid storage container 101, the splashing of the recording liquid can be controlled if the inner wall 104 of the liquid storage container 101 faces the opening of the injecting portion 202 of the liquid replenishing container 201. Especially in the case where the depressed portion or the step difference is formed on the inner wall 104 of the receiving portion 102, it is preferable that the injecting portion 202 is inserted in a direction where the opening faces the depressed portion or the step difference, as described in Embodiment 2.

In the examples indicated in FIGS. 5A and 5B, the injecting portion 202 is inserted into the receiving portion 502 such that the engaging portion 501 is aligned with the engaged portion 503. The injecting portion 202 is inserted to the position of the O-O cross-section in FIG. 5A, of which size is the same as the receiving port of the receiving portion 502. By engaging the engaging portion 501 and the engaged portion 503, the directions and positions of the liquid storage container 101 and the liquid replenishing container 201 can be determined such that the opening of the injecting portion 202 is directed to an appropriate position facing the inner wall 104.

The shapes of the engaging portion 501 of the liquid replenishing container 201 and the engaged portion 503 of the liquid storage container 101 are not limited to the shapes exemplified in FIGS. 5A and 5B, as long as at least one of the directions and positions, with respect to each other, can be determined. The engaging portion 501 and the corresponding engaged portion 503 may be disposed at a plurality of locations, and may be disposed in any direction.

The cross-sectional shapes of the engaging portion 501 and the engaged portion 503 may be triangular or square or the like, for example, as long as the relative positions of the liquid replenishing container 201 and the liquid storage container 101 can be determined thereby.

In the liquid replenishing system 100 having a plurality of liquid storage containers 101, the engaged portion 503 may have a shape, which is engageable with the engaging portion 501 of a corresponding liquid replenishing container 201 but is not engageable with the engaging portions of the liquid replenishing containers corresponding to the other liquid storage containers.

Among the liquid storage containers 101 included in the liquid discharging device, if the shapes of the engaged portions 503 of the adjacent liquid storage containers 101 are different, the chances that a different type of recording liquid is replenished to each liquid storage container 101 in error can be reduced. Further, if the shapes of the engaged portions 503 of a plurality of liquid storage containers 101 included in the liquid discharging device are different from one another, then the state that a different type of recording liquid is replenished to each liquid storage container 101 in error can be prevented.

According to the present disclosure, the contamination caused by recording liquid when the recording liquid is replenished to the liquid storage container can be controlled.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-098816, filed on Jun. 14, 2021, which is hereby incorporated by reference herein in its entirety.

What is claimed is:

1. A liquid replenishing bottle configured to replenish recording liquid to a liquid discharging device, wherein the liquid discharging device includes (A) a recording head and (B) a liquid storage container for supplying the recording liquid to the recording head, and wherein the liquid storage container includes (1) a liquid storage portion containing the recording liquid replenished from the liquid replenishing bottle and (2) a receiving portion being provided on an upper side of the liquid storage portion, the liquid replenishing bottle comprising:

a holding portion that holds the recording liquid to be replenished to the liquid discharging device; and an injecting portion for insertion into the receiving portion in an inserting direction having a gravity direction component, wherein the injecting portion includes (1) an opening to discharge the recording liquid in the holding portion and (2) an engaging portion that is engageable with an engaged portion of the receiving portion, wherein the opening is opened in a direction intersecting with the inserting direction, and wherein the engaging portion positions the injecting portion with respect to the receiving portion so that the opening faces a predetermined direction with respect to an inner wall of the receiving portion.

2. The liquid replenishing bottle according to claim 1, wherein the injecting portion includes a tip portion which protrudes at an end of the injecting portion in a direction that intersects with the inserting direction and that is toward an inner wall of the receiving portion, and wherein the opening opens in the tip portion in the direction in which the tip portion protrudes.

3. The liquid replenishing bottle according to claim 1, wherein the injecting portion includes a curved tip portion which protrudes at an end of the ejecting portion with curving from the inserting direction toward an inner wall of the receiving portion, and wherein the opening opens in the curved tip portion in a direction in which the curved tip portion protrudes.

4. The liquid replenishing bottle according to claim 1, wherein a width of the opening in a circumferential direction increases in direction to an end of the injecting portion.

5. The liquid replenishing bottle according to claim 1, wherein the opening is disposed on both sides, as a pair, in a direction orthogonal to the inserting direction.

6. The liquid replenishing bottle according to claim 1, wherein the opening faces a direction intersecting the inserting direction.

7. A liquid replenishing system comprising:

the liquid replenishing bottle according to claim 1, wherein the receiving portion of the liquid storage container includes (1) a receiving port to which the injecting portion is inserted, and to which the recording liquid is injected via the opening of the injecting portion, which is inserted into the receiving port, and (2) a region on an inner wall that faces the opening.

8. The liquid replenishing system according to claim 7, wherein the receiving portion includes an inclined surface in the region on the inner wall facing the opening, and wherein the inclined surface is inclined such that the recording liquid, which is discharged from the opening toward the inner wall of the receiving portion, contacts the inner wall of the receiving portion and then moves in a direction toward the liquid storage portion.

9. The liquid replenishing system according to claim 8, wherein the inclined surface is inclined so as to be distant from the receiving port in a direction orthogonal to the inserting direction of the injecting portion, as the distance from the receiving port increases.

10. The liquid replenishing system according to claim 7, wherein the receiving portion includes:

a first wall face that faces the injecting portion on the inner wall on the side closer to the receiving port; and a second wall face that faces the opening more distant from the injecting portion than the first wall face, on the inner wall on the side more distant from the receiving port than the first wall face.

11. The liquid replenishing system according to claim 10, wherein the liquid storage container includes a protrusion at a position, on the outer surface of the receiving portion, corresponding to the second wall face.

12. The liquid replenishing system according to claim 11, wherein a plurality of liquid storage containers are provided, wherein the plurality of liquid storage containers are disposed adjacent to each other such that respective receiving portions of the plurality of liquid storage containers face a same direction, and wherein each of respective protrusions of the plurality of liquid storage containers is disposed on the outer surface of the receiving portion, on one side in a direction where the plurality of liquid storage containers are adjacent to each other.

13. The liquid replenishing system according to claim 11, wherein a plurality of liquid storage containers are provided, wherein the plurality of liquid storage containers are disposed adjacent to each other such that respective receiving portions of the plurality of liquid storage containers face a same direction, and wherein each of respective protrusions of the plurality of liquid storage containers is disposed on the outer surface of the receiving portion, at a position distant from a region facing another adjacent receiving portion.

14. The liquid replenishing system according to claim 7, wherein the injecting portion is inserted downward into the receiving portion in a vertical direction.

15. The liquid replenishing system according to claim 7, wherein the injecting portion is inserted downward into the receiving portion diagonally with respect to a vertical direction.

16. The liquid replenishing system according to claim 15, wherein the receiving portion includes a region, which is inclined in the inserting direction of the injecting portion, in a region on the inner wall facing the opening.

17. The liquid replenishing system according to claim 7, wherein the receiving portion includes a protrusion, which protrudes toward a region facing the opening, on the inner wall on a side more distant from the receiving port than the region facing the opening.

18. The liquid replenishing bottle according to claim 1, wherein the inserting direction is vertical in a direction of gravity.

19. The liquid replenishing bottle according to claim 1, wherein the inserting direction is oblique downward relative to a direction that is vertical in a direction of gravity.

20. The liquid replenishing bottle according to claim 1, wherein the receiving portion is disposed on an end side of the liquid storage portion and protrudes from the liquid storage portion.

21. The liquid replenishing bottle according to claim 1, wherein when the injecting portion is inserted into the receiving portion, there is a gap between (1) a part of an outer wall of the injecting portion and (2) the inner wall of the receiving portion.

22. The liquid replenishing bottle according to claim 1, wherein the predetermined direction is a direction in which the recording liquid discharged from the opening contacts with the inner wall of the receiving portion.

* * * * *